United States Patent [19]

de Rahm

[11] Patent Number: 4,879,131
[45] Date of Patent: Nov. 7, 1989

[54] PREPARATION OF WHEY PRODUCTS HAVING REDUCED ALLERGERICITY

[75] Inventor: Olivier de Rahm, La Tour-de-Peilz, Switzerland

[73] Assignee: Nestec S.A., Vevey, Switzerland

[21] Appl. No.: 245,463

[22] Filed: Sep. 16, 1988

[30] Foreign Application Priority Data

Oct. 15, 1987 [CH] Switzerland .......................... 4041/87

[51] Int. Cl.$^4$ .......................... A23C 7/04; A23C 9/14; A23L 1/305
[52] U.S. Cl. .................................. 426/583; 426/330.2; 426/491; 426/801
[58] Field of Search ...................... 426/330.2, 583, 491, 426/801

[56] References Cited

U.S. PATENT DOCUMENTS

| | | | |
|---|---|---|---|
| 1,085,380 | 7/1914 | Dounham et al. | 426/583 |
| 2,036,404 | 4/1936 | Frohring | 426/801 |
| 2,555,514 | 5/1951 | Sharp et al. | 426/583 |
| 2,903,358 | 9/1959 | Block et al. | 426/491 |
| 4,036,999 | 7/1977 | Grindstaff | 426/583 |
| 4,748,034 | 4/1988 | de Rham | 426/330.2 |

FOREIGN PATENT DOCUMENTS

2139630 11/1984 United Kingdom ................ 426/583

OTHER PUBLICATIONS

Webb et al., Fundamentals of Dairy Chemistry, The Avi Publishing Co., Inc., Westport CT, 1974.
Hildago et al., "Solubility and Neat Stability of Whey Protein Concentrates", Journal of Dairy Science, 60:1515–1518, 1977.
McLaughlan et al., "Effect of Heat on the Anaphylactic—Sensitizing Capacity of Cow's Milk, Goat's Milk, and Various Infant Formulae Fed to Guinea—Pigs", Archives of Disease in Childhood, 1981, 56, pp. 165–171.
Kilshaw et al., "Effects of Heat Treatment of Cow's Milk and Whey on the Nutritional Quality and Antigenic Properties", Archives of Disease in Childhood, vol. 57, No. 11, pp. 842–847, British Medical Association, London, (1982).
Li—Chan, "Heat—Induced Changes in Proteins of Whey Protein Concentrate", Journal of Food Science, vol. 48, Jan.–Feb. 1983, No. 1, pp. 47–56.
deWit et al., "Effects of Various Heat Treatments on Structure and Solubility of Whey Proteins", Journal of Diary Science 67:2701–2710, 1984.
Heppell et al., "Reduction in the Antigenicity of Whey Proteins by Heat—Treatment: A Possible Strategy for Producing a Hypoallergenic Infant Milk Formula", British Journal of Nutrition (1984), 51, pp. 29–36.
Coombs, et al., "Allergenicity of Food Proteins and Its Possible Modification", Annals of Allergy, vol. 53, 1984, pp. 592–596.
de Rham et al., "Role of Ionic Environment in Insolubilization of Whey Proteins During Heat Treatment of Whey Products", Journal of Dairy Science, 67:939–949, 1984.

Primary Examiner—Donald E. Czaja
Assistant Examiner—H. Pratt
Attorney, Agent, or Firm—Vogt & O'Donnell

[57] ABSTRACT

Whey products having reduced allergenicity are prepared by heating an aqueous solution of a whey product containing nondenatured whey proteins in an amount of from 0.5% to 5% by weight. The solution has a pH of from 5.5 to 8.5 and a free calcium content of from 6 mmol/l to 15 mmol/l and is heated to a temperature of from 90° C. to 140° C. for a time sufficient for obtaining a treated whey product solution having a residual allergenic $\beta$-lactoglobulin content of less than 0.1% of the $\beta$-lactoglobulin content of the aqueous whey product solution to be treated.

6 Claims, No Drawings

PREPARATION OF WHEY PRODUCTS HAVING REDUCED ALLERGERICITY

BACKGROUND OF THE INVENTION

This invention relates to a process for the production of a whey product of reduced allergenicity.

It is known that allergies to cow's milk and to industrial products adapted to the needs of infants which contain cow's milk are due mostly to the fact that the proteins of cow's milk and of these industrial products differ from the proteins of maternal milk. The most allergenic proteins of cow's milk include, in particular, β-lactoglobulin which represents the largest fraction by weight of whey proteins.

In addition, it is known that heat treatment equivalent to sterilization in particular, can reduce the allergenicity of certain proteins. However, some uncertainty still exists in this field.

SUMMARY OF THE INVENTION

The object of the present invention is to provide a process for the production of a whey product of reduced allergenicity which may be used, in particular, for the preparation of milks adapted to the needs of infants and which is both simple and safe, eliminating the uncertainty mentioned above.

Thus, the process according to the present invention is characterized in that it comprises the steps of preparing an aqueous solution of whey components which contains 0.5 to 5% by weight of proteins, adjusting its pH value to 5.5-8.5, adjusting its free Ca content to 6-15 mmol/l and heating it for 2 to 10 minutes at 90°-140° C. until it has a residual allergenic β-lactoglobulin content of less than 0.1% of its initial β-lactoglobulin content.

It has been found that the allergenicity of a protein cannot be satisfactorily reduced simply by denaturing the protein by heating. Instead denaturing has to be carried out under particular conditions, particularly in the presence of a minimal quantity of free Ca.

In the context of the invention, the term "allergenicity" is to be understood to mean "antigenic activity capable of initiating allergic reactions in humans, particularly sensitive infants". The allergenicity of the product obtained by the process according to the invention is estimated quantitatively as a function of the antigenically active β-lactoglobulin content of the product as determined by the ELISA test. This test, which is well known to the man skilled in the art, comprises determining an enzyme marking an antibody that binds to a specific antibody of β-lactoglobulin that binds to the β-lactoglobulin which is itself fixed to a support insoluble in aqueous medium.

DETAILED DESCRIPTION OF THE INVENTION

In the context of the invention, the residual allergenic β-lactoglobulin content of the product obtained by the process according to the invention is considered as having to be at least below 0.1% of its initial β-lactoglobulin content for the reduction in the allergenicity of the product to be of practical interest. In other words, the treatment of the proteins by the process according to the invention is considered as having to allow at least this, requirement to be satisfied for the product to be able to be effectively used in the preparation of foods, particularly milks adapted to the needs of infants, of which the consumption involves hardly any sensitization of the consumer, to the proteins which it contains.

The allergenicity of the product obtained by the process according to the invention is also estimated qualitatively using the model of a guinea pig. This, because it is known that although the results of such tests are not directly applicable to humans, they nevertheless provide useful indications.

The expression "free Ca" is to be understood as the "Ca which is not bound to any anion". The free Ca content of said aqueous solution of whey components is determined by means of a specific electrode of which the Ca-sensitive part is a membrane containing an ion exchanger capable of absorbing the free Ca.

The process according to the invention may be carried out using any whey starting material containing the whey proteins in non-denatured form. This starting material may be a cheese-quality whey, particularly a sweet whey such as that emanating from the coagulation of rennet type case in or an acidic whey such as that resulting from the coagulation of acid type casein. The starting material may also be a whey demineralized by ion exchange or electrodialysis for example, or even a concentrate of whey proteins obtained by ultrafiltration or dialysis for example. It may be present equally as an aqueous solution, a concentrate or a powder.

To prepare the aqueous solution of whey components which contains 0.5-5% by weight proteins, it is thus possible to start out from a starting material of the type described above and, where it is a powder, a concentrate or a solution, to dissolve it in distilled water, dilute it and/or adjust its protein content within the indicated limits. If the protein content of the solution is adjusted to a value above 5% by weight, the proteins may be in danger of gelling during the subsequent heat treatment. Adjustment of the protein content of the solution to a value below about 0.5% by weight, although possible, does not have any particular advantage. In practice, there is hardly any reason to adjust the protein content of the solution to a value below that of the whey itself which is at the lower end of the range indicated.

The pH of the solution may be adjusted to a value of from 5.5 to 8.5 by addition of HCl or NaOH for example. If the pH is adjusted to a value below 5.5, it is not possible to obtain the expected product. If the pH is adjusted to a value above 8.5, there is a risk of unwanted tastes appearing, lysinoalanine being produced and/or the amino acids being isomerized.

The free Ca content of the solution may be adjusted to 6-15 mmol/l by addition of Ca chloride, hydroxide or lactate for example. It is preferably adjusted by addition of $CaCl_2$. If the free Ca content of the solution is adjusted to a value below 6 mmol/l, there is a danger that the allergenicity of the whey product according to the invention may not be able to be sufficiently reduced. By contrast, it is preferred to adjust the free Ca content to a value below 15 mmol/l for practical reasons, in other words, for reasons associated with the Ca content which should not be exceeded by the end product for the production of which the present whey product is intended.

The end product in question may be, for example, a milk powder adapted to the needs of infants which may be prepared in particular by mixing the present dehydrated whey product with a suitable vegetable fat and standardizing the lactose, mineral element and vitamin contents of the mixture.

The solution may be heated for 2-10 minutes at 90°-140° C. in a heat exchanger, an autoclave or by injection of steam for example. To obtain the desired reduction in allergenicity, therefore, the solution is heated for a few minutes at the temperatures indicated, about 2 minutes being sufficient at around 130°-140° C. and about 10 minutes being sufficient at around 90°-100° C. Temperatures below 90° C. do not enable the desired reduction in allergenicity to be obtained in reasonable times. Temperatures above 140° C. are in danger of producing a significant increase in the Maillard reactions.

As mentioned above, the product obtained by the process according to the invention is an intermediate product preferably intended for the preparation of milks adapted to the needs of infants. Where this is in fact the intended application of the product, the starting material preferably used for its production may be a demineralized sweet whey either partially ultra filtered or enriched with whey proteins obtained by ultrafiltration so that its protein content is of the order of 17% by weight of dry matter and the protein content of the end product may then be approximately 12% by weight of dry matter after-addition of vegetable fat.

EXAMPLES

The process according to the invention is illustrated by the following Examples in which the percentages are by weight. The free Ca content is measured by means of a specific electrode as described above. The residual allergenic β-lactoglobulin content is determined by the ELISA test mentioned above and is expressed in percent of the initial β-lactoglobulin content.

EXAMPLE 1

A sweet whey is ultrafiltered until the protein content of the retentate dry matter is 80%.

A 1.25% aqueous solution of the retentate is prepared by diluting it in distilled water. This solution has a protein content of 1%, a total Ca content of 2.6 mmol/l and a free Ca content of 1.7 mmol/l. Its pH is adjusted to 7.8 by addition of NaOH. Its free Ca content is adjusted to 9.5 mmol/l by addition of 7.8 mmol/l of $CaCl_2$. The solution is heated for 10 minutes at 100° C. by injection of steam. After this treatment, the solution has a residual allergenic β-lactoglobulin content of 0.02% of its initial β-lactoglobulin content.

By contrast, if for comparison the solution is heated for 10 minutes at 100° C. without its free Ca content having been adjusted beforehand, in other words, without the 7.8 mmol/l $CaCl_2$ having been added, its residual allergenic β-lactoglobulin content after this heat treatment is 9% of its initial β-lactoglobulin content, which is still far too high.

EXAMPLE 2

A sweet whey is demineralized by passage over a cation exchanger and then over an anion exchanger. It is then ultrafiltered until the solution formed by the retentate has a dry matter content of 10% including 1.7% proteins. The respective total Ca and free Ca contents of this solution are 1.3 and 0.9 mmol/l.

The pH of this solution is adjusted to 6.7 by addition of NaOH. Its free Ca content is adjusted to 6 mmol/l by addition of 5.1 mmol/l of $CaCl_2$. The solution is heated for 0 minutes at 95° C. by injection of steam. After this treatment, the solution has a residual allergenic β-lactoglobulin content of 0.05% of its initial β-lactoglobulin content.

By contrast, if for comparison no $CaCl_2$ is added or if only 3.5 mmol/l of $CaCl_2$ is added to the solution, the solution has a residual allergenic β-lactoglobulin content after similar heat treatment of 18%. in the first case and 3% in the second case, in percent of its initial β-lactoglobulin content.

EXAMPLE 3

A sweet whey is demineralized by passage over an anion exchanger and then a cation exchanger. Its dry matter content is adjusted to 10%. 0.8% whey proteins obtained by ultrafiltration and having a purity of 80% are then added, giving a solution having a dry matter content of 10.8%, of which the protein content is 1.8% and the respective total Ca and free Ca contents 2.5 and 1.7 mmol/l.

The pH of this solution is adjusted to 6.35 by addition of NaOH. Its free Ca content is adjusted to 13 mmol/l by addition of 11.3 mmol/l of $CaCl_2$. The temperature of this solution is increased to 95° C. by injection of steam. The solution is kept at 95° C. for 10 minutes in a dwell tank and is then suddenly cooled. After this treatment, the solution has a residual allergenic β-lactoglobulin content of 0.05% of its initial β-lactoglobulin content.

EXAMPLE 4

The whey product obtained in Example 3 is used to feed eight guinea pigs and to try to make them allergic to the proteins which it contains. The result of this attempt to sensitize guinea pigs is verified by giving each guinea pig an intravenous injection of whey proteins obtained by ultrafiltration and not treated by the process according to the invention. After the injection, two of the eight guinea pigs show non-lethal allergic symptoms and the other six show no allergic symptoms.

In other words, this attempt to sensitize guinea pigs to the proteins of whey produced hardly any sensitization of significance because the allergenicity of the proteins had been reduced practically to zero beforehand by the process according to the invention.

EXAMPLE 5

Six guinea pigs are fed with whey proteins obtained by ultrafiltration and not treated by the process according to the invention to make the guinea pigs allergic to these proteins. Each guinea pig is then given an intravenous injection of the whey product obtained in Example 3. After these injections, two of the six guinea pigs show non-lethal allergic symptoms and the other four show no allergic symptoms.

In other words, although the guinea pigs had been made allergic to the whey proteins, the proteins of the present product were unable to produce an anaphylactic shock because their allergenicity had been reduced substantially to zero by the process according to the invention.

COMPARISON EXAMPLE

Each guinea pig of Example 5 is also given an intravenous injection of proteins obtained by ultrafiltration and not treated by the process according to the invention. All these guinea pigs succumb to an anaphylactic shock.

This Example, by comparison with Examples 4 and 5 above, demonstrates the remarkable effectiveness of the process according to the invention in reducing the allergenicity of whey proteins as tested on the model of guinea pigs.

I claim:

1. A process for reducing e allergenicity of whey products comprising preparing an aqueous solution of a whey product having from 0.5% to 5.0% by weight of non-denatured whey proteins, adjusting the pH of the solution to a pH of from 5.5 to 8.5, adjusting free calcium content of the solution to a concentration of from 6 mmol/l to 15 mmol/l and heating the solution for from about 2 minutes to about 10 minutes at a temperature of from 90° C. to 140° C. for obtaining a treated whey product solution having a residual $\beta$-lactoglobulin content of less than 0.1% of a $\beta$-lactoglobulin content of the aqueous solution of the whey product to be treated.

2. A process according to claim 1 wherein the free calcium content of the solution is adjusted by adding a substance selected from a group consisting of calcium chloride, calcium hydroxide and calcium lactate to the solution.

3. A process according to claim 1 wherein the whey product to be treated is demineralized.

4. A process according to claim 1 wherein the whey product to be treated is selected from a group consisting of sweet whey, acidic whey, demineralized whey and a concentrate of whey proteins.

5. A process according to claim 4 wherein the sweet whey is ultrafiltered.

6. A process according to claim 4 wherein the sweet whey is enriched with whey proteins obtained by ultrafiltration.

* * * * *

UNITED STATES PATENT AND TRADEMARK OFFICE
CERTIFICATE OF CORRECTION

PATENT NO. : 4,879,131
DATED : November 7, 1989
INVENTOR(S) : Olivier de RHAM

It is certified that error appears in the above-identified patent and that said Letters Patent is hereby corrected as shown below:

On the title page, in the inventor's name, "Rahm" should be --Rham--.

On the title page, in the title, "ALLERGERICITY" should be --ALLERGENICITY--.

Column 1, at the repetition of the title, "ALLERGERICITY" should be --ALLERGENICITY--.

Column 1, line 17, insert a comma after "sterilization".

Column 1, line 39, insert a comma after "Instead".

Column 5, line 4 (line 1 of claim 1), "e" should be --the--.

Signed and Sealed this

Ninth Day of October, 1990

Attest:

HARRY F. MANBECK, JR.

Attesting Officer

Commissioner of Patents and Trademarks